United States Patent
Chang et al.

(10) Patent No.: US 7,776,223 B2
(45) Date of Patent: Aug. 17, 2010

(54) METHOD OF COLLECTING HIGH-LEVEL RADIOACTIVE URANIUM POWDER UNDERWATER

(75) Inventors: Kuo-Yung Chang, Taoyuan County (TW); Heng-Shiung Shen, Taoyuan County (TW); Li Ma, Taoyuan County (TW); Chung-Sheng Chen, Taoyuan County (TW); Tsu-Man Chen, Taoyuan County (TW)

(73) Assignee: Institute of Nuclear Energy Research, Longton, Taoyuan (TW)

( * ) Notice: Subject to any disclaimer, the term of this patent is extended or adjusted under 35 U.S.C. 154(b) by 64 days.

(21) Appl. No.: 12/173,030

(22) Filed: Jul. 15, 2008

(65) Prior Publication Data

US 2010/0012594 A1 Jan. 21, 2010

(51) Int. Cl.
*B01D 21/02* (2006.01)

(52) U.S. Cl. .................. 210/747; 210/803; 210/170.04; 210/170.05; 210/532.1; 15/1.7; 37/320; 376/310

(58) Field of Classification Search .................. 210/747, 210/800, 803, 85, 167.01, 172.1, 170.04, 210/170.05, 532.1, 533, 534; 15/1.7; 37/317, 37/320; 376/310

See application file for complete search history.

(56) References Cited

U.S. PATENT DOCUMENTS

| | | | | |
|---|---|---|---|---|
| 2,580,012 A * | 12/1951 | Gazda | ..................... | 210/532.1 |
| 3,815,267 A * | 6/1974 | Laarman | ..................... | 37/317 |
| 4,008,146 A * | 2/1977 | Bain et al. | .................. | 210/803 |
| 4,231,873 A * | 11/1980 | Swigger | ................ | 210/170.05 |
| 4,268,392 A * | 5/1981 | Hayes | ..................... | 210/532.1 |
| 4,854,058 A * | 8/1989 | Sloan et al. | ............ | 210/170.04 |
| 4,959,146 A * | 9/1990 | Kristan | ........................ | 376/310 |
| 5,080,783 A * | 1/1992 | Brown | ................... | 210/170.05 |
| 5,205,174 A * | 4/1993 | Silverman et al. | ........... | 376/310 |
| 6,161,701 A * | 12/2000 | Biesinger | ................. | 210/532.1 |
| 6,219,399 B1 * | 4/2001 | Naruse et al. | ............... | 376/308 |
| 6,352,645 B1 * | 3/2002 | Wilfong | ....................... | 15/1.7 |
| 6,568,541 B2 * | 5/2003 | Koreis et al. | ................ | 210/534 |

* cited by examiner

*Primary Examiner*—Christopher Upton

(57) ABSTRACT

This present invention is related to a method of collecting high-level radioactive contaminated uranium powder underwater. It utilizes a long rod fixed to the pipe of the sewage pump at bottom, and takes another end of the sewage pump to connect to the sediment bag to collect uranium powder which is dispersed and contaminates the pond. Inhaling the pond water contains uranium powder into the sediment bag by sewage pump that is joined to a collecting can under it and waiting for precipitation of the powder. When the uranium powder in the sediment bag is completely precipitated into the collecting can, operator can utilize submersible pump to drain the pond water from the sediment bag. Operator may hold the cable wire of the uranium powder collecting can manually to move it to the collecting shelf and repeat the process several times until the high-level radioactive uranium powder in the contaminated pond are all collected on the uranium powder collecting shelf.

7 Claims, 3 Drawing Sheets

METHOD OF COLLECTING HIGH-LEVEL RADIOACTIVE URANIUM POWDER UNDERWATER

BACKGROUND OF THE INVENTION

1. Field of the Invention

This invention relates to the fields of a method of collecting high-level radioactive uranium powder underwater, which is simple, easy to operate, and can effectively promote collecting process of high-level radioactive contaminated materials underwater.

2. Description of the Prior Art

During the decommission of nuclear facilities, the operation of related work and the storage of defective fuel rods raise the leakage of high radioactive uranium powders from certain high radioactive fuel rods and deposit at the bottom of the pond which is used for storage of them. For clean up the pond of decommission of nuclear facilities, it should collect the high radioactive uranium powder and remove it in order to proceed smoothly with subsequent process.

Conventionally, since there is little experience to deal with decommission of nuclear facilities, it should consider the possibility of cumulated radioactive dose which would harm the humans exposing in such a working environment for long time.

A complete collecting method comprises a working staff operating underwater remote-control automatic collecting equipment outside the radioactive region. However, this equipment is extremely cumbersome for operating and must be compatible with underwater camera system to complete the collection operations. Even it offers a better result and keeps the staff away from the radiation working area to avoid radioactive dose cumulated, it works slowly with poor efficiency, and is costly and inconvenient in practical applications. The object of the invention is to provide a method of collecting high-level radioactive uranium powder underwater with low cost, simple process and better efficiency, and be able to avoid staffs from accumulating much radioactive dose.

SUMMARY OF THE INVENTION

The invention relates to a method of collecting high-level radioactive uranium powder underwater, which is simple, easy to operate, and also reduces exposure of staffs to radiation, yet effectively promotes collecting efficiency and gets cost down.

In order to achieve the above object, the invention provides a method of collecting high-level radioactive uranium powder underwater comprising steps:

(a) Suctioning pond water containing uranium powder; moving a pipe of first sewage pump around at the bottom of the pond to inhale the water containing uranium powder;

(b) Pumping the water containing uranium powder into a sediment bag by first sewage pump;

(c) Waiting for precipitation of uranium powder in the sediment bag into uranium powder collecting can: turning off first sewage pump when the sediment bag gets full of water and waiting for three days to precipitate uranium powder into the uranium powder collecting cancan completely;

(d) Pumping the pond water from the sediment bag and draining it to the pond through a pipe of second sewage pump;

(e) Determining whether the uranium powder collecting can has been filled full: observing whether the uranium powder collecting can has been filled full with uranium powder, if it is 'NO', repeating the steps (a) through (d);

(f) Replacing uranium powder collecting can: if the result from step (e) is 'YES', the uranium powder collecting can filled full should be replaced with an empty one.

In order to achieve the above object the invention provides a device of collecting high-level radioactive uranium powder underwater, at least comprising: a sediment bag which is erected in the pond containing uranium powder, forming a funnel-shaped with an opening of the top higher than water level of the pond; a sewage pumps, which utilizes a pipe to connect to the sediment bag, and at the other end of the pump extends a pipe with suction opening to move around at the bottom of pond for suctioning the pond water containing uranium powder into the sediment bag; an uranium powder collecting can, which is connecting to the bottom of the sediment bag for depositing the precipitated uranium powder; a submersible pump, which utilizes pipes to connect to the sediment bag to pump the pond water which has been precipitated to return to the pond.

A clearer understanding of the present invention will be obtained from the disclosure which follows when read in light of the accompanying drawings.

DETAILED DESCRIPTION OF THE PREFERRED EMBODIMENT

Figure 1:
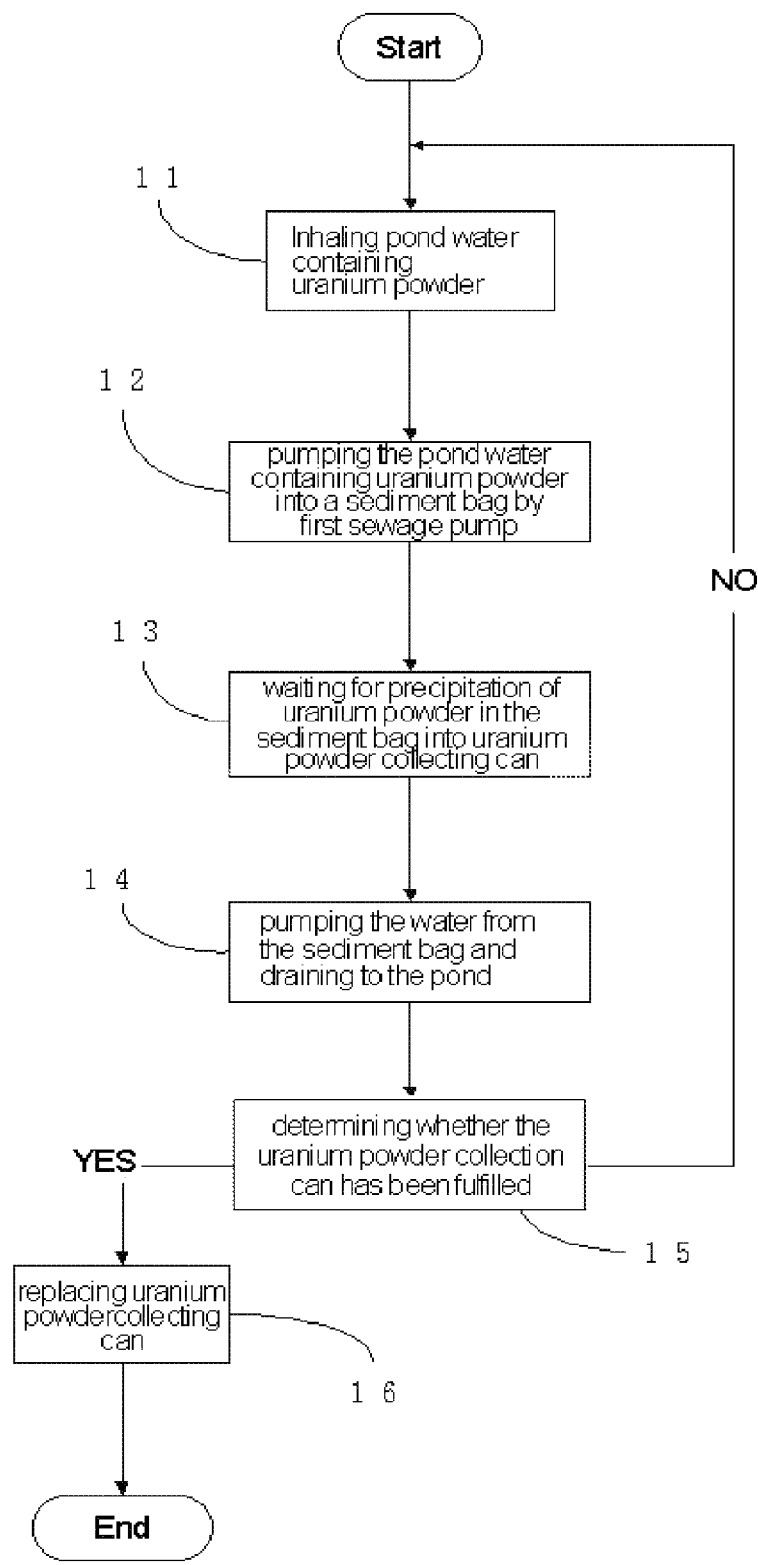
FIG. 1 is an operational flow chart of the present invention
Figure 2:
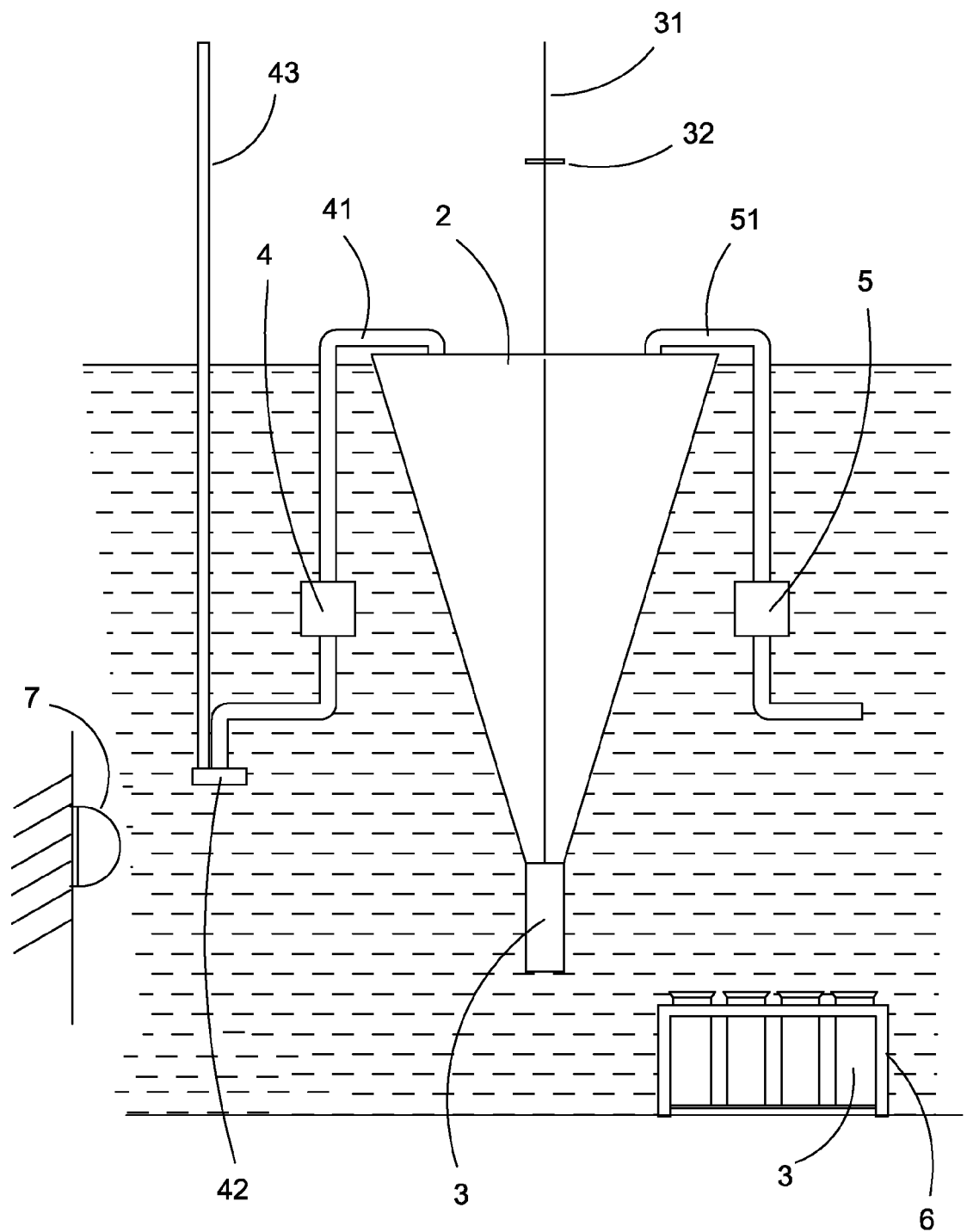
FIG. 2 is a perspective view of the present invention
Figure 3:
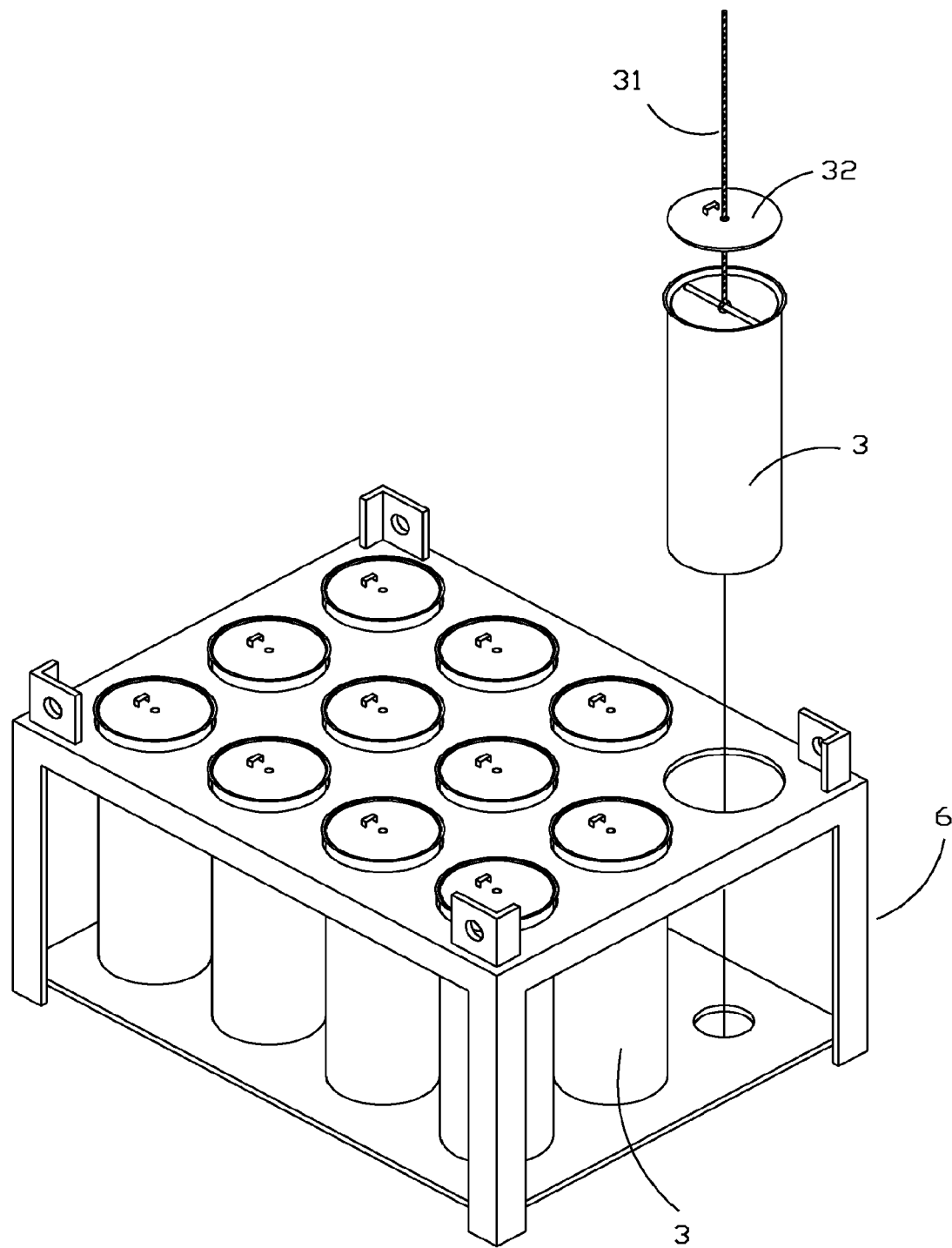
FIG. 3 is a graph showing the structure of uranium powder collecting can of the present invention

The preferred embodiments of the present invention will be described below in greater detail with reference to the accompanying drawings. To facilitate understanding, identical reference numerals are used, where possible, to designate identical or equivalent elements that are common to the embodiments, and, in subsequent embodiments, these elements will not be further explained.

The main process of the present invention comprises: Step 11 "suctioning pond water containing uranium powder"; Step 12 "pumping the pond water containing uranium powder into a sediment bag by first sewage pump"; Step 13 "waiting for precipitation of uranium powder in the sediment bag into uranium powder collecting can"; Step 14 "pumping the pond water from the sediment bag and draining it to the pond"; Step 15 "determining whether the uranium powder collecting can has been filled full"; Step 16 "replacing uranium powder collecting can". The device structure that is compatible with the invention comprises: a sediment bag 2, which is erected in the pond containing uranium powder forming a funnel-shaped with an opening of the top higher than water level of the pond; a sewage pump 4 and a submersible pump 5 which utilize a pipe 41 and 51 to connect to the sediment bag 2. The suction opening 42 of the pipe 41 is connected to a long rod 43 which is stretched out the pond. The bottom of the sediment bag 2 is connected to a uranium powder collecting can which is hanged by the cable wire 31 through the lid 32 on it.

The embodiment is to be carried out as follows:

Step 11 "suctioning pond water containing uranium powder" is moving a long rod 43 manually around a pond and utilizing an underwater monitoring device 7 to lead the suction opening 42 moving around the bottom of the pond to inhale the pond water containing uranium powder. Step 12

"pumping the pond water which contains uranium powder into a sediment bag" is pumping the pond water containing uranium powder into the sediment bag 2 through the pipe 41 by sewage pump 4. Due to the top of the sediment bag 2 is higher than water level of the pond, it is sufficient to isolate the pond water outside of the sediment bag 2. Step 13 "waiting for precipitation of uranium powder in sediment bag to drop into uranium powder collecting can" is turning off the sewage pump 4 when the sediment bag 2 is filled full with pond water, and waiting for three days to precipitate the uranium powder which is in the sediment bag 2 completely into the uranium powder collecting can 3. Step 14 "pumping the water from the sediment bag and draining to the pond" is draining the pond water in the sediment bag 2 to outside through pipe 51 by submersible pump 5. Then check in Step 15 "determining whether the uranium powder collecting can has been filled full", if it is 'NO', repeating the Steps 11 through 14; if it is 'YES', it continues to the next step. Step 16 "replacing uranium powder collecting can" is using a cable wire 31 manually to fix the lid 32 on the uranium powder collecting can 3, hanging it with the cable wire 31 to move to the collecting shelf 6, and replacing the uranium powder collecting can 3 under the sediment bag 2 with an empty one for continuing the collecting process.

The foregoing invention has been described in detail by way of illustration and example for purposes of clarity and understanding. As is readily apparent to one skilled in the art, the foregoing are only some of the methods and compositions that illustrate the embodiments of the foregoing invention. It will be apparent to those of ordinary skill in the art that variations, changes, modifications and alterations may be applied to the compositions and/or methods described herein without departing from the true spirit, concept and scope of the invention.

What is claimed is:

1. A method of collecting high-level radioactive uranium powder underwater, comprising:
    (a) collecting pond water from the bottom of a pond containing uranium powder by moving a first sewage pump at the bottom of the pond, suctioning the water, and pumping the water to a sediment bag within said pond, said sediment bag comprising a collecting can removably connected to the bottom of said bag;
    (b) after said sediment bag being filled full with water, turning off said first sewage pump, waiting for three days to complete precipitation of uranium powder from said sediment bag into said uranium powder can, and draining water from said sediment bag to the pond through a second sewage pump;
    (c) determining if the uranium powder collecting can has been filled full with uranium powder, if it is 'NO', repeat the steps (a) through (b); if it is 'YES', then replace the filled full uranium powder collecting can with an empty one.

2. A device of collecting high-level radioactive uranium powder underwater, comprising:
    (a) a sediment bag within a pond containing uranium powder, said sediment bag having a conical shape with a larger open top end supported above the water level of said pond
    (b) a first sewage pump connected to said sediment bag with a pipe at one end, and a suction opening connected at the other end of said first sewage pump with a pipe for suctioning the water from the bottom of said pond into said sediment bag with aid of a monitoring device;
    (c) an uranium powder can connected to the bottom of said sediment bag for depositing uranium powder obtained by precipitation; and
    (d) a second pump connected to said sediment bag with a pipe for pumping the water from said sediment bag into said pond after precipitation.

3. A device of collecting high-level radioactive uranium powder underwater according to claim 2, wherein said uranium powder collecting can is connected to the bottom of said sediment bag with a cable wire through a lid of said uranium powder collecting can.

4. A device of collecting high-level radioactive uranium powder underwater according to claim 2, wherein said suctioning opening connected to said first sewage pump with a pipe is linked to a long rod for moving around at the bottom of the pond manually.

5. A device of collecting high-level radioactive uranium powder underwater according to claim 4, wherein there is a shelf erected in the pond to accommodate said uranium powder collecting can.

6. A device of collecting high-level radioactive uranium powder underwater according to claim 2, wherein there is a shelf erected in the pond to accommodate said uranium powder collecting can.

7. A device of collecting high-level radioactive uranium powder underwater according to claim 2, wherein said monitoring device is a camera erected in the pond.

* * * * *